United States Patent [19]

Brooks et al.

[11] Patent Number: 5,280,580
[45] Date of Patent: Jan. 18, 1994

[54] SYSTEM SERVICE REQUEST PROCESSING IN MULTIPROCESSOR ENVIRONMENT

[75] Inventors: William B. Brooks, Woodstock; Mark A. Hoffstatter, Kingston; Ronald S. Manka, Woodstock; Roger I. Miller, Kingston, all of N.Y.

[73] Assignee: International Business Machines Corporation, Armonk, N.Y.

[21] Appl. No.: 518,609

[22] Filed: May 2, 1990

[51] Int. Cl.$^5$ .............................................. G06F 13/00
[52] U.S. Cl. ................................................... 395/200
[58] Field of Search ........................................ 395/200

[56] References Cited

U.S. PATENT DOCUMENTS 4,387,427 6/1983 Cox et al. ........................... 364/200

Primary Examiner—Robert L. Richardson
Attorney, Agent, or Firm—William A. Kinnaman

[57] ABSTRACT

A method and apparatus for handling system service requests such as disk change requests in a system containing a primary processor and at least one secondary processor, each of which has one or more processes running thereon. Requests originating from processes running on the primary processor are added directly to a primary queue and the corresponding processes suspended pending the completion of the requested system service, at which time the processes are resumed and the requests are purged from the primary queue. Each secondary processor manages a secondary queue of system service requests originating from processes running on that processor, which are suspended while the requests remain on the secondary queue. When a request is added to an empty secondary queue, a process on the secondary processor issues its own request to the primary processor, which is added to the primary queue, and suspends execution while awaiting a response from the primary processor. Upon completion of the requested system service, the primary processor resumes the suspended process on the secondary processor that issued the request to the primary processor, which in turn resumes the original requesting processes on the secondary processor and purges the secondary queue.

11 Claims, 5 Drawing Sheets

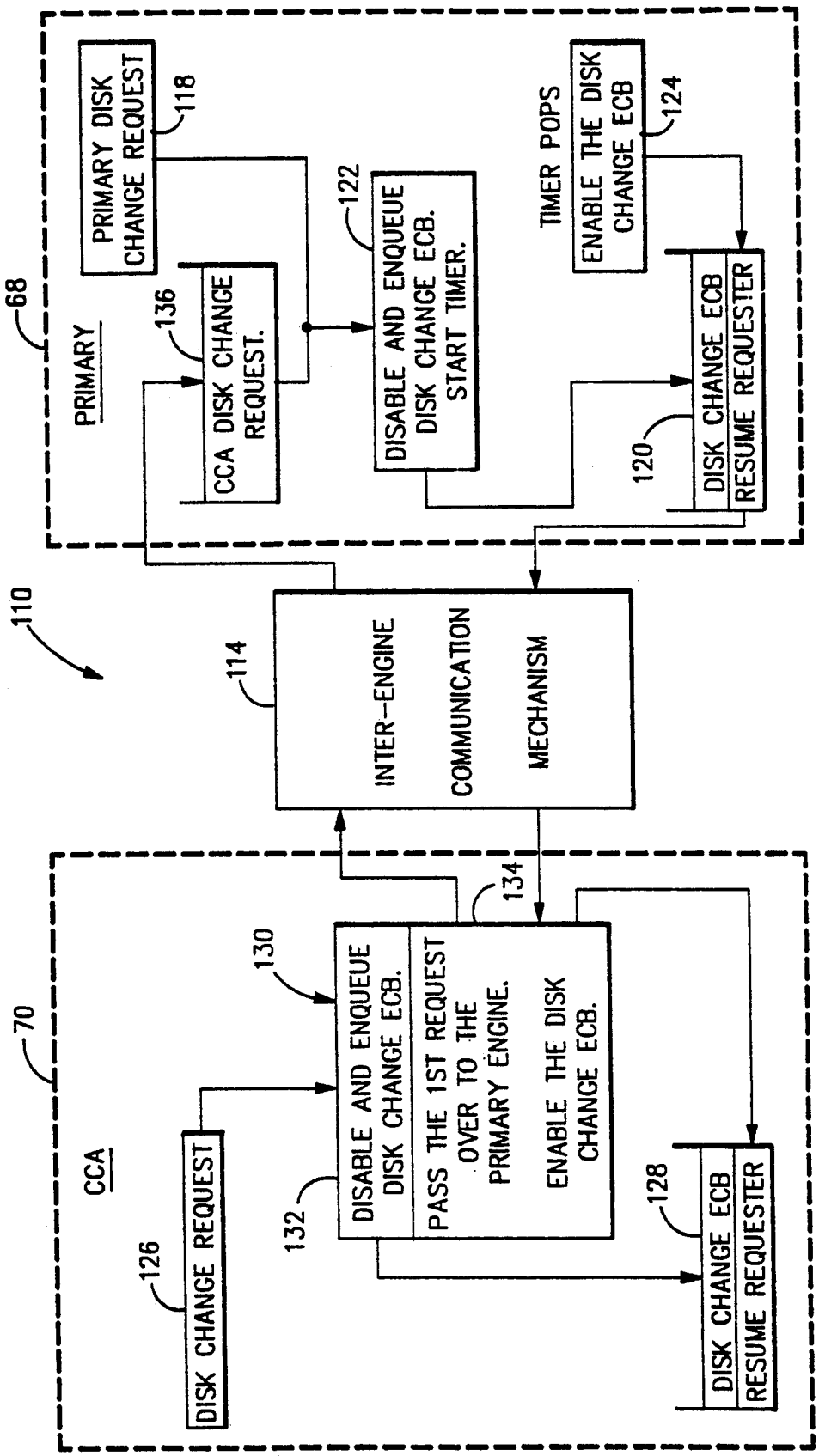

SYSTEM SERVICE REQUEST PROCESSING IN MULTIPROCESSOR ENVIRONMENT

BACKGROUND OF THE INVENTION

1. Field of the Invention

This invention relates to a method and apparatus for handling system service requests in a multiprocessor environment and, in particular, to a method and apparatus for handling disk change requests in a device control unit having a plurality of concurrent communication adapters for attachment to host processors.

2. Description of the Prior Art

Communications and device controllers are, to an increasing extent, being implemented with multiple processors—more particularly, with multiple microprocessors. Typically, the implementation is done with a predefined function split, with the supplemental processors serving to handle low-level hardware interfaces and to provide a function-specific interface with the primary processor.

As a particular example, the IBM 3174 Subsystem Control Unit, which interconnects devices such as display terminals or printers to local or remote host processors, has a primary processor, which exercises general supervisory control over the operation of the control unit, as well as a plurality of host adapters, each of which contains a secondary processor for performing functions specific to that adapter. In addition to the usual communications between the primary processor and the secondary processor incident to the operation of the control unit to interface between the host processors and the devices, there are also those communications relating to such "housekeeping" operations as the handling of disk change requests or other system service requests.

It would be desirable if such requests could be made by an application running on a secondary processor without altering the application making the request.

SUMMARY OF THE INVENTION

In general, the present invention contemplates a method and apparatus for handling system service requests such as disk change requests in a system containing a primary processor and at least one secondary processor, each of which has one or more processes running thereon. Requests originating from processes running on the primary processor are added directly a primary queue and the corresponding processes suspended pending the completion of the requested system service (e.g., a disk change on a specified drive), at which time the processes are resumed and the requests are purged from the primary queue.

Each secondary processor manages a secondary queue of system service requests originating from processes running on that processor. The originating processes are suspended while the requests remain on the secondary queue. When a request is added to an empty secondary queue, a process on the secondary processor issues its own request to the primary processor, which is added to the primary queue, and suspends execution while awaiting a response from the primary processor. Upon completion of the requested system service, the primary processor causes the suspended process on the secondary processor that issued the request to the primary processor to resume. That resumed process in turn resumes the original requesting processes on the secondary processor and purges the secondary queue.

BRIEF DESCRIPTION OF THE DRAWINGS

FIG. 5 is a schematic diagram illustrating the sequence of flow for processing disk change requests in the control unit shown in FIG. 1 and 2 in accordance with the present invention.

DESCRIPTION OF THE PREFERRED EMBODIMENT

Figure 1:
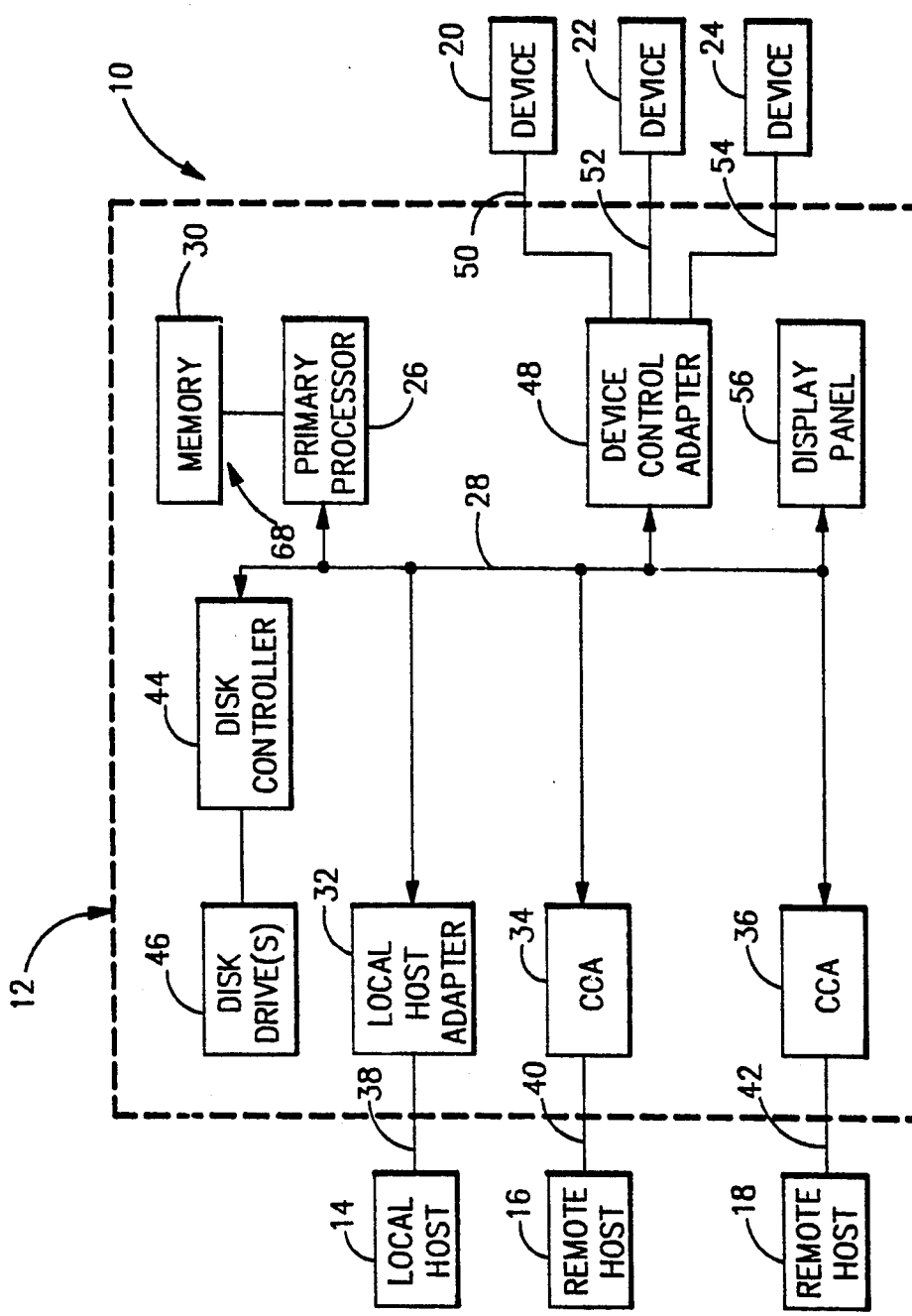
FIG. 1 is a schematic block diagram of a control unit, with attached hosts and devices, incorporating the present invention.

Referring now to FIG. 1, a system 10 incorporating our invention includes a control unit 12 for interconnecting a local host computer 14 and remote host computers 16 and 18 with devices 20, 22 and 24. Although two remote host computers 16 and 18 are shown in FIG. 1, this is by way of example only, and a different number of remote host computers may be attached instead. Respective links 38, 40 and 42 of any suitable type couple host computers 14-18 to control unit 12. In a manner conventional in the art, remote host computers 16 and 18 are attached to control unit 12 through modems (not shown) at the control unit ends of the links 40 and 42. Control unit 12 is generally constructed as shown in U.S. Pat. No. 4,811,284, the disclosure which is incorporated herein by reference. Devices 20 through 24 may be of various types, such as display terminals, printers or the like.

Control unit 12 includes a primary processor 26 and attached memory 30 coupled to an internal bus 28. Also coupled to bus 28 are various host adapters including a local host adapter 32 coupled to local host 14 via link 38 and remote host adapters (referred to herein as concurrent communication adapters, or CCAs) 34 and 36 coupled to remote hosts 16 and 18 via links 40 and 42.

Bus 28 is also coupled to one or more disk drives 46 (shown as a single drive in FIG. 1) via a disk controller 44. A device control adapter (DCA) 48, described in detail in the patent referred to above, couples bus 28 to respective lines 50, 52 and 54 to devices 20-24. Finally, a display panel 56 of any suitable type known to the art is coupled to bus 28 through a suitable controller (not separately shown). Display panel 56 is used to display messages to the operator, such as those referred to herein requesting a disk change.

Figure 2:
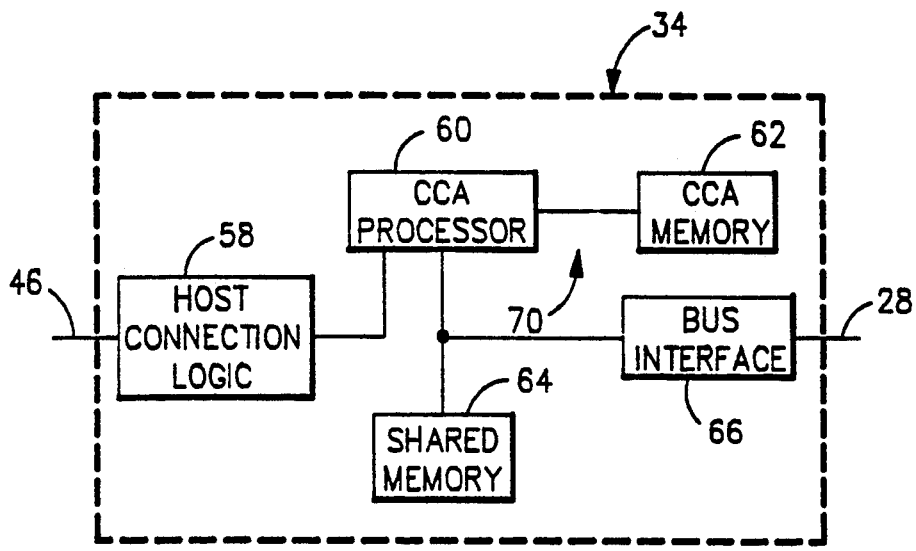
FIG. 2 is a schematic block diagram of one of the concurrent communication adapters (CCAs) of the control unit shown in FIG. 1.
Figure 3:
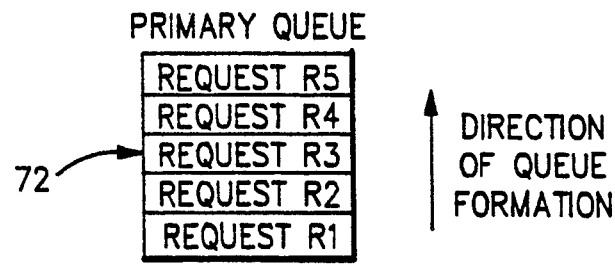
FIG. 3 is a schematic diagram of a queue in which disk change requests originating from the primary processor of the control unit shown in FIG. 1 are stored while awaiting processing.
Figure 4:
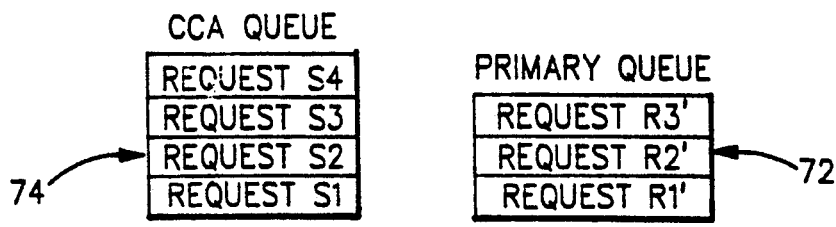
FIG. 4 is a schematic diagram of the respective queues maintained by the primary processor and a CCA processor in the case of disk change requests originating from the CCA processor.
Figure 7:
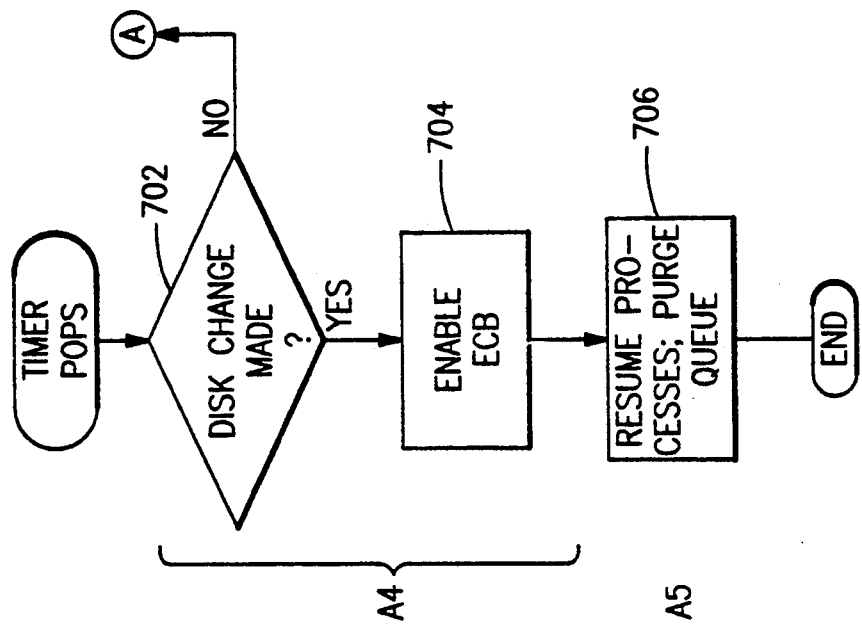
FIG. 7 is a flowchart of the procedure followed by the primary processor when the timer pops.
Figure 6:
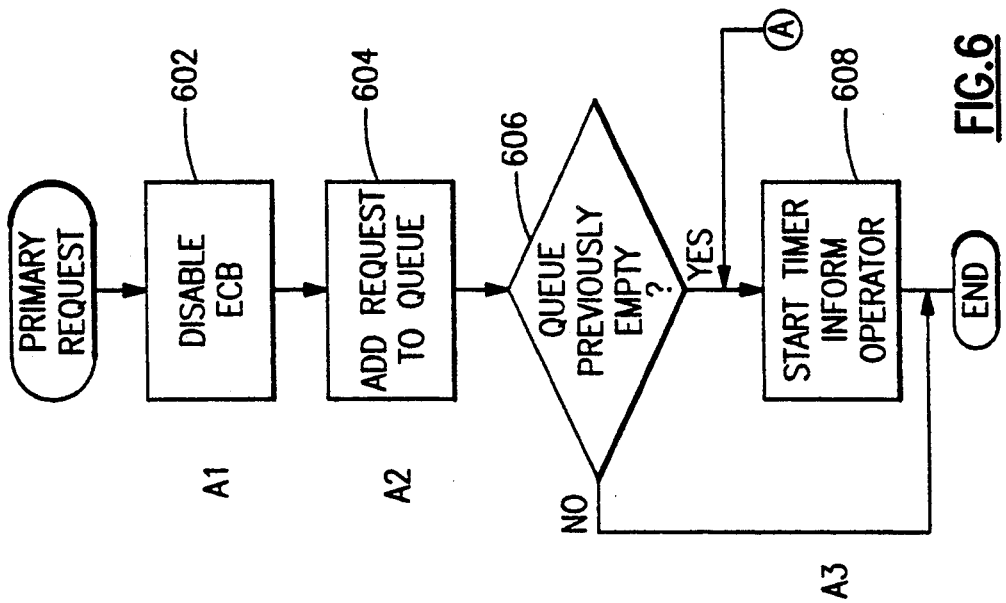
FIG. 6 is a flowchart of the procedure used by the primary processor to handle disk change requests.
Figure 10:
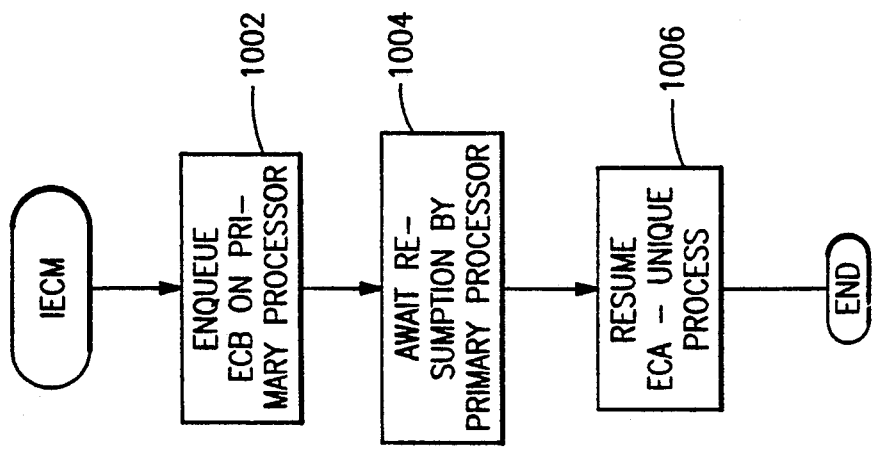
FIG. 10 is a flow chart of the procedure used by the inter-engine communication mechanism to interact with the primary and secondary processors.
Figure 9:
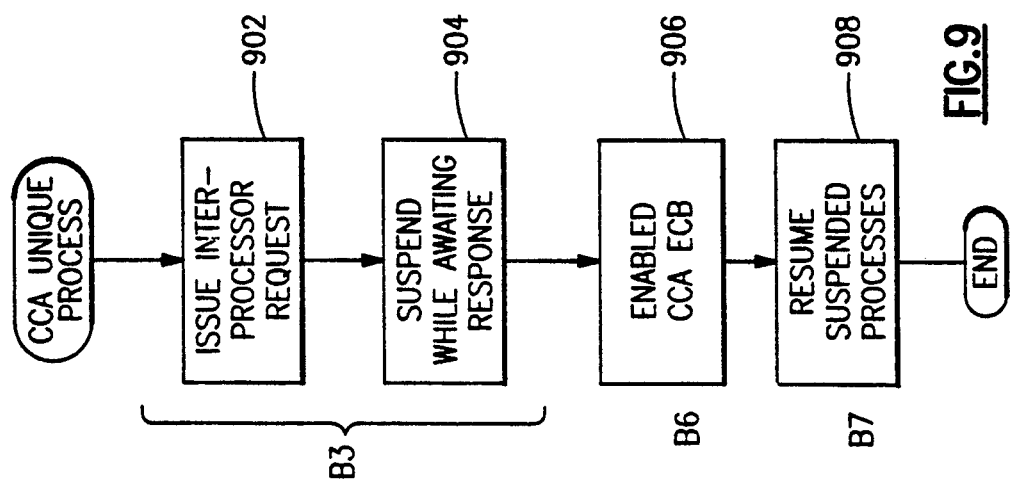
FIG. 9 is a flowchart of the procedure used by a secondary processor to interact with the primary processor via the inter-engine communication mechanism.
Figure 8:
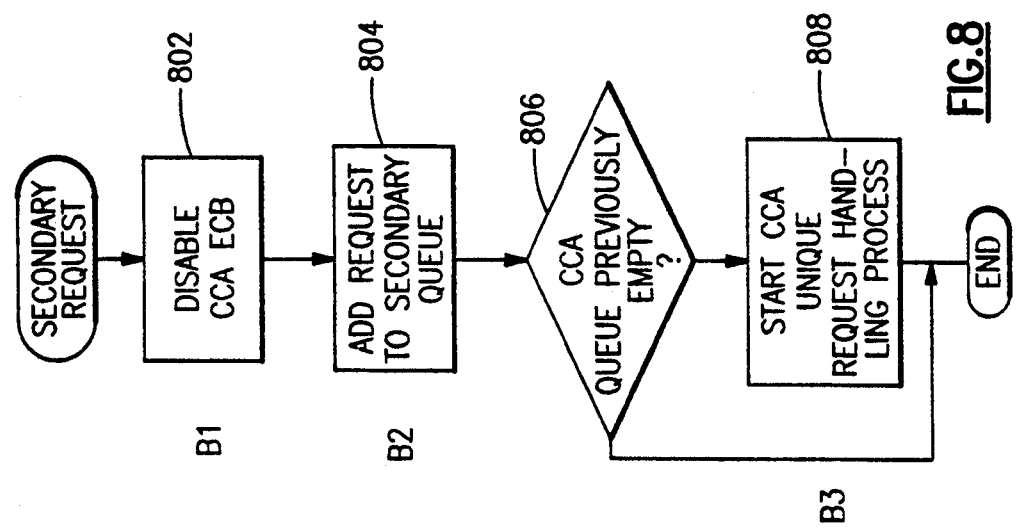
FIG. 8 is a flowchart of the procedure for handling disk change requests originating from a secondary processor.

CCA 36 is identical to CCA 34, shown in FIG. 2. As shown in that figure, CCA 34 comprises host connection logic 58 interfacing with the host link 40, a CCA processor 60 (also referred to as a "secondary" processor herein) coupled to host connection logic 58, a CCA memory 62 coupled to CCA processor 60 that is addressable only by that CCA processor, and a shared memory 64 coupled to the CCA processor 60 that is addressable by both the CCA processor and the primary processor 26. CCA 34 also contains a bus interface 66 that couples the bus interconnecting processor 60 and shared memory 64 to control unit bus 28.

To summarize the addressing scheme used in control unit 12, primary memory 30 is addressable only by the primary processor 26 to which it is attached, while similarly, CCA memories 62 of CCAs 34 and 36 are addressable only by the particular processors 60 of the CCAs to which they are attached. Each shared memory 64 of a CCA, on the other hand, is addressable not only by the processor 60 of that CCA, but also by the primary processor 26, the addresses of each shared memory 64 being mapped to a unique portion of the address space of the primary processor 26. However, a CCA cannot directly access the shared memory of another CCA.

Primary processor 26 and its attached memory 30 are referred to herein collectively as the "primary engine" 68, while, similarly, the processor 60 and nonshared memory 62 of each CCA 34 or 36 are referred to herein collectively as a "secondary engine" or "CCA engine" 70.

Each of processors 26 or 60 may have one or more concurrent processes. In the course of its execution, one of these processes may request a disk change or other system service and suspend execution pending the processing of that request. In the control unit 12, the suspension and resumption of processes depending on the occurrence of external events such as the completion of a disk change or other system service are regulated by environment control blocks (ECBs), storage areas associated with the processors 26 and 60 that contain appropriate information regarding the state of these tasks. The use of such control blocks for similar purposes is well known in the art and does not as such form part of the present invention.

More particularly, each processor 26 or 60 of the control unit 12 has an associated disk change environment control block (ECB) for each disk drive 46. Thus, if, as in the preferred embodiment, the control unit 12 has two disk drives 46, each processor 26 or 60 has two disk change ECBs, one for each drive. For the purposes of this invention, each disk change ECB has two relevant states: enabled and disabled. If the disk change ECB is enabled, then all processes on that particular processor running in that environment may continue without interruption as far as that particular ECB is concerned. If, on the other hand, the ECB is disabled, then all processes on that particular processor running in that environment are suspended while the ECB remains disabled. Note that each ECB only controls processes running on the processor that it is associated with. If, for example, a disk change ECB of CCA 34 is disabled, that has no effect on processes running on processor 60 of CCA 36 or on primary processor 26, and vice versa.

Communications between the primary processor 26 and the secondary processor 60 of a CCA 34 or 36 are managed by an inter-engine communication mechanism (IECM) 114 (FIG. 5), which consists of code resident in the shared memory 64 of each CCA 34 and 36, the execution of which is divided between the primary processor 26 and the CCA processors 60. IECM 114 routes incoming communications from CCAs 34 and 36 to primary processor through an intermediary queue which it manages to accommodate the random nature of the communications. IECM 114 manages a similar intermediary queue for outgoing communications from primary processor 26. Similar inter-processor communication mechanisms are known in the art, and the details of implementation of the IECM used herein do not form part of the present invention.

Referring now to FIGS. 3 and 5-7, before describing how the disk change procedure works in a multiprocessor environment, it is best to explain how it works in a single-processor environment, which is still how it works on the primary processor 26.

When an application process 118 (sometimes referred to as simply an "application") running on the primary processor 26 makes a disk change request R1 the following events occur:

A1. The environment, as represented by a control block 120, that exists for disk change events on that particular drive is "disabled", as shown at 122 (step 602). This means that process 118, as well as any other processes running on processor 26 that exist in that environment (i.e., have made a disk change request for that drive), will not be able to run. Processors that have not made such a disk change request, however, continue to run.

A2. The particular drive's disk change environment control block (ECB) 120 is then "enqueued." This adds the request R1 from process 118 to the primary queue 72 (FIG. 3) of disk change requests for that disk drive made by other (step 604) processes.

A3. If, as in this example, the primary queue 72 for that disk drive was previously empty (step 606), a timer is started, and a numerical code is displayed on the display panel 56 (FIG. 1) asking the operator to change the disk in the specified drive (step 608). Subsequent to the first request R1, other requests R2 through R5 for a disk change on the same drive may originate from other processes running on primary processor 26. These additional requests do not result in any additional message being generated, but like the first request R1, remain stacked up on the primary queue 72, and the processes they represent suspended, until the disk change event occurs.

A4. When the timer times out, or "pops", a process 124 checks to see if the disk change event occurred. If a disk change was made then this process 124 "enables" the disk change ECB 120 (step 704). If no disk change event has occurred, this step and the preceding step (step A3) are repeated.

A5. Upon being enabled, the disk change ECB 120 resumes the processes corresponding to requests R1-R5, which were stacked up on primary queue 72 waiting for the disk change to occur, at the points where they were suspended, and the entire stack of requests R1-R5 are purged from the primary queue 72 (step 706). The resumed processes read the disk and, if the disk is not the correct disk, the processes submit further requests and the procedure starts anew.

As noted above, the timer is only started when the first request R1 is added to an empty primary queue 72 or if the timer times out and the disk change event has not occurred. The timer is not started for additional disk change requests R2-R5 that are added to the primary queue 72 while the first request R1 is pending.

In managing disk change requests from a CCA 34 or 36, the same basic procedure is followed as above. The principal difference on a CCA is that instead of starting a timer a disk change request is issued to the primary processor 26 using the inter-engine communication mechanism 114. Referring to FIGS. 4, 5, and 8-10 the following describes the procedure for handling a disk change request S1 originating from an application process 126 running on processor 60 of CCA 34 (requests from other CCAs are handled similarly):

B1. The disk change ECB 128 maintained by CCA 34 for the particular drive is "disabled", as shown at segment 132 of block 130 (step 802). This ECB 128 corresponds to the disk change ECB 120 of the primary processor 26. This means that process 126, as well as any other processes running on processor 60 of CCA 34 that exist in that environment (i.e., have made a disk change request for that drive), will not be able to run, and thus the processes queued up on that control block 128 will remain "suspended." This is no different from step A1 of the procedure on the primary processor 26, described above.

B2. The particular drive's disk change ECB 128 is then "enqueued" (segment 132). This adds the request S1 to the CCA queue 74 (FIG. 4) of disk change requests for that disk drive made by other processes running on processor 60 of CCA 34 (step 804). This is no different from step A2 of the procedure on the primary processor 26, described above.

B3. If, as in this example, no other disk change requests for that drive have been made from a process running on processor 60 of CCA 34, and request S1 was added to a previously empty secondary queue 74 (step 806), a CCA-unique request-handling process (segment 134 of block 130) gains control (step 808). This process 134 "enqueues" the inter-engine communication mechanism (IECM) 114 to "relay" the disk change request S1 to the primary processor 26 by issuing its own interprocessor disk drive change request R1' (step 902). This mechanism 114 is synchronous, in this use of it, so the process 134 suspends and waits for a response to its request before passing any other requests to the IECM 114 (step 904). Subsequent to the first request S1, other requests S2 through S4 for a disk change on the same drive may originate from other processes running on processor 60 of CCA 34. These additional intraprocessor requests S2-S4 do not result in any additional interprocessor request being issued to the primary processor 26 via the IECM 114, but like the first request S1 they remain stacked up on the CCA queue 74, and the processes they represent remain suspended. B4. The inter-engine communication mechanism 114 then "enqueues" another environment control block 136 on the primary processor 26 that will make the disk change request R1' for CCA 34 (step 1002).

B5. At this point the request R1' originating from CCA 34 is handled in a manner similar to that of a request originating from a process running on the primary processor 26, with steps A1 to A5 of the primary-only procedure, described above, being replicated.

Thus, if, as in this example, the primary queue 72 for disk change events for that drive was previously empty, the corresponding ECB 120 is disabled (step 602), request R1' is added to the primary queue 72 (step 604), and the timer is started (step 608) as a preliminary to steps 704 and 706. Subsequent to receiving request R1', the primary queue 72 may also receive an intraprocessor request R2' from an application process running on the primary processor 26 and an interprocessor request R3', originating from CCA 36, which is generated in a manner similar to that of request R1'. These additional requests R2'-R3' remain suspended along with request R1', but do not cause the timer to be restarted or any additional operator message to be generated. These actions occur, if at all, only if the timer times out and the disk has not been changed.

B6. When the disk change event finally occurs, the ECB 120 is again enabled (step 704), the processes corresponding to requests R1'-R3' are resumed (step 706), and the primary queue 72 is purged. One of the processes that gets "resumed" is the inter-engine communication mechanism 114 (step 1004). This mechanism 114 will then "resume" the CCA-unique process 134, running on processor 60 of CCA 34, which issued the disk change request R1', by notifying process 134 that the requested disk change has been completed (step 1006). The CCA-unique process 134 in turn will "enable" the disk change environment control block 128 (step 906). The corresponding CCA-unique process 134 of CCA 36 that issued the request R3' is also resumed in a similar manner.

B7. The disk change environment control block 128 maintained by CCA 34 then "resumes" all the processes corresponding to requests S1-S4 that were stacked up on the CCA queue 74 waiting for the disk change event to occur, including in particular the process 126 issuing the request S1 (step 908). A similar set of actions is performed by the CCA 36 which issued request R3'. This is the same as step A5 on the primary processor 26.

Preferably, the same code segment is used to implement request-handling processes 122 and 124 on the primary processor 26 and block 130 on the processor of each CCA 34 or 36. A stored flag external to the segment is used to indicate to the processor in question whether it is the primary processor 26 or a secondary processor 60, and thus what action to take after disabling the ECB 120 or 128 and adding the disk change request to its queue. If, as indicated by the flag, the process is running on the primary processor 26, the code starts the timer. If, on the other hand, the flag indicates that the process is running on a secondary processor 60, the code instead passes the original request over to the primary processor 26 via the inter-engine communication mechanism 114. All of this is transparent to the original requesting process 118 or 126, which only knows that it has added its request to a queue on the same processor 26 or 60 and is controlled by a local ECB 120 or 128.

While the invention has been particularly shown and described with reference to preferred embodiments, it will be understood by those skilled in the art that various changes in form and details may be made therein without departing from the spirit and scope of the invention. Thus, while the invention has been described with particular reference to the processing of disk change requests, it may also be used for the processing of other system service requests in a multiprocessor environment.

What is claimed is:

1. In a system containing a primary processor and a secondary processor, each of said processors having one or more processes running thereon, requests originating from said primary processor being added to a primary queue managed by a process running on said primary processor, a method of handling a request originating from a process running on said secondary processor including the steps of (a) adding said request to a secondary queue managed by a process running on said secondary processor and (b) issuing a request from said secondary processor to said primary processor upon the addition of a request to an empty secondary queue.

2. A method as in claim 1 in which said system contains a plurality of secondary processors, each of which manages a secondary queue of requests and issues a request to said primary processor upon the addition of a request to an empty secondary queue.

3. A method as in claim 1 in which said system contains a disk drive and said requests are disk drive change requests.

4. A method as in claim 3 in which said secondary processor has associated therewith a disk change environment control block (ECB) representing the environment for disk change events on said drive, said method including the step of disabling said ECB to suspend any processes existing in that environment.

5. A method as in claim 4 including the step of enabling said ECB upon the occurrence of a disk change event to resume said suspended processes.

6. A method as in claim 1 in which said system includes a mechanism for communicating between said processors, said mechanism managing an intermediary queue of requests originating from said secondary processors.

7. A method as in claim 6 in which said step of issuing said request to said primary queue includes the step of routing said request through said intermediary queue.

8. In a system containing a primary processor and a secondary processor, each of said processors having one or more applications running thereon, apparatus for handling system service requests originating from said applications comprising means for managing respective primary and secondary queues associated with said processors, means responsive to the issuance of a request from an application running on a processor for adding said request to the queue associated with said processor, means responsive to the addition of a request to an empty primary queue for initiating the requested system service, means responsive to the addition of a request to an empty secondary queue for issuing an interprocessor request from said secondary processor to said primary processor, and means responsive to the issuance of said interprocessor request for adding said request to said primary queue.

9. Apparatus as in claim 8 in which said applications remain suspended while the requests issued therefrom remain on said queues.

10. Apparatus as in claim 9, further comprising means responsive to the completion of the requested system service for resuming the suspended applications and purging the requests from said applications from said queues.

11. Apparatus as in claim 10 in which said resuming means includes means for notifying said secondary processor of the completion of said system service and means responsive to said secondary processor and purging the requests from said applications from said secondary queue.

* * * * *